United States Patent [19]

Myrick

[11] Patent Number: 5,045,937
[45] Date of Patent: Sep. 3, 1991

[54] GEOGRAPHICAL SURVEYING USING MULTIPLE CAMERAS TO OBTAIN SPLIT-SCREEN IMAGES WITH OVERLAID GEOGRAPHICAL COORDINATES

[75] Inventor: E. L. Myrick, Merritt Island, Fla.

[73] Assignee: Space Island Products & Services, Inc., Merritt Island, Fla.

[21] Appl. No.: 398,600

[22] Filed: Aug. 25, 1989

[51] Int. Cl.$^5$ ............................................. H04N 7/18
[52] U.S. Cl. .................................. 358/109; 358/110; 358/113
[58] Field of Search ............... 358/109, 113, 103, 110, 358/183, 83

[56] References Cited

U.S. PATENT DOCUMENTS

| | | | |
|---|---|---|---|
| 3,053,932 | 9/1962 | Worst | 358/110 X |
| 3,076,961 | 2/1963 | Bibbero | 343/6 |
| 3,456,072 | 7/1969 | Nyman | 178/6.6 |
| 3,752,915 | 8/1973 | Parker et al. | 178/6.7 R |
| 3,798,366 | 3/1974 | Hunt et al. | 38/113 X |
| 4,227,211 | 10/1980 | Disbrow | 358/113 |
| 4,237,492 | 12/1980 | Roth et al. | 358/113 X |
| 4,298,280 | 11/1981 | Harney | 358/109 X |
| 4,516,158 | 5/1985 | Grainge et al. | 358/109 |
| 4,608,598 | 8/1986 | Murakami et al. | 358/113 |
| 4,862,257 | 8/1989 | Ulich | 358/109 X |

OTHER PUBLICATIONS

Ljungberg, Sven-Ake; "Aerial Thermography—Cartographic Presentation of Thermographic Data for Building Applications"; SPIE-The International Society for Optical Engineering Proceedings; Mar. 29-31, 1989; vol. 1094, pp. 13-22.

Safabakhsh, Reza; "Processing Infrared Images for High Speed Power Line Inspection"; SPIE-The International Society for Optical Engineering Proceedings; Mar. 29-31, 1989; vol. 1094, pp. 75-82.

Primary Examiner—Victor R. Kostak
Attorney, Agent, or Firm—James H. Beusse

[57] ABSTRACT

An earth surface surveying system uses an IR camera to obtain IR images of a selected area. A video camera operates in association with the IR camera to obtain video images in geographic and time sequence with images obtained by the IR camera. A processor allows split-screen viewing of the IR and video images so that areas of interest in the IR image can be identified from the video image. The system also includes apparatus for overlaying earth surface coordinates on the images from a global navigation system to enable identifying the location of areas in the images.

26 Claims, 2 Drawing Sheets

GEOGRAPHICAL SURVEYING USING MULTIPLE CAMERAS TO OBTAIN SPLIT-SCREEN IMAGES WITH OVERLAID GEOGRAPHICAL COORDINATES

BACKGROUND OF THE INVENTION

1. Field of Invention

The present invention relates to infrared surveys of geographical areas and, more particularly, to an improved survey system and method using infrared and color television images and having means for determining and recording coordinates of points of interest of the survey.

2. Description of the Prior Art

Geographical surveys utilizing infrared sensors are extremely useful for a number of activities. For example, such surveys are applicable to detection of gas pipeline links; detection of problems in electric power transmission lines; determining the density of populated areas; search and rescue missions; pollution studies; and timber surveys. Infrared detection systems provide information concerning areas having a distinct temperature differential from the background temperatures and use of such systems for surveys is known in the art. However, a major problem in such surveys that has not been adequately solved is accurate determination of the location of small ground features detected by an infrared system.

A typical prior art infrared survey system is disclosed by Dibbero, U.S. Pat. No. 3,076,961. An airborne multiple sensor system is used having an infrared camera, a television camera, and a radar scanner. The multiple sensors provide detection and identification of camouflaged targets such as required in military operations. No means for producing accurate ground coordinates of detected targets is provided. Parker et al., in U.S. Pat. No. 3,752,915, teach recording on magnetic tape of thermal ground and reference data obtained from an airborne scanner to produce color images. U.S. Pat. No. 4,516,158 to Grainge et al. shows two airborne infrared scanners that scan in different directions.

None of the above systems provide accurate identification of ground coordinates, such as latitude and longitude, of located targets nor altitude from which the survey was made. Therefore, a need remains for an accurate survey system utilizing infrared scanning, color video, and video recording that includes means for recording the latitudes and longitudes of small areas of interest located during the survey. For aerial surveys in which a system provides latitude and longitude coordinates, which provides means for locating the coordinates with a ground vehicle is required.

SUMMARY OF THE INVENTION

The present invention utilizes a camera pod having two color video cameras and an IR imager head. For aerial surveys, the pod may be mounted below the fuselage of a fixed wing aircraft or helicopter. The IR imager head includes a plurality of infrared detectors supplied with cryogenic cooling and means for scanning the detectors over a field of view directly downward from the aircraft. The two video cameras cover essentially the same field of view as the IR imager with one camera having a normal field of view and the other camera having a wide angle view. The analog infrared data from the IR imager head is transmitted to an IR data processor which converts the data to a standard NTSC color television frame. The resolution of the imager provides sixteen levels of color indicative of the temperatures in the scene. The IR data processor produces a master composite sync signal to which the two video cameras are slaved or "genlocked". The video signal from the normal field of view camera and the color television signal from the IR data processor are fed to a special effects generator which produces a split screen in which an upper portion of the screen displays the color IR image of a forward frame and the lower portion of the screen displays the color video image from the video camera of the following portion of that frame. The wide angle video camera output is recorded on a second video recorder and the composite split screen image from the special effects generator is recorded on a first video recorder. The video recorders each operate separate monitors by which the operator may observe the scenes being recorded.

Advantageously, the split screen technique permits a playback of the recorded images to allow any anomaly, or point of interest appearing in the forward infrared portion of a frame to be tracked into the color video portion of a following frame. Slow motion or stop-frame playback thereby permits analysis of the point as to the source of the infrared data.

To accurately locate points of interest in the recorded scenes, a global position system (GPS) is provided and connected to an external antenna. A computer receives the output from the GPS on its RS-232 input and is programmed to produce latitude and longitude information in alphanumeric form therefrom which is superimposed and recorded on each frame of the two video recorders along with the scenes from the video and IR cameras being recorded thereon. When the system is used in an aircraft, a radar altimeter is provided with an output connected through the game port or analog to digital input port of the computer to generate the altitude alphanumeric information which is also superimposed on the video recorder frames.

The altitude, and latitude and longitude information along with the known lens angle permits distances in each frame on the monitor to be scaled and the coordinates of any points of interest to be accurately determined during playback.

The aircraft communication equipment audio outputs are fed to the audio inputs of the video recorders, such that operator comments and other useful audio information may be recorded contemporaneously with the video recordings.

To permit on-ground surveys, the system may be installed in a rugged terrain vehicle with the camera pod mounted on the roof. When an aerial survey is made, a GPS may be installed in a ground vehicle to be able to locate points of interest found during the survey at specific latitude and longitude coordinates. In difficult terrain, hand carried equipment may be used.

Advantageously, the survey system invention is suitable for locating leaks in gas pipelines, locating lost personnel, air search and rescue, detecting hot spots in electric power transmission systems, and similar applications where a point of interest is at a different temperature than the surroundings.

It is therefore a principle object of the invention to provide a survey system having color video cameras and an infrared imager to permit recording of color images of the area being surveyed simultaneously with infrared images in a color display in which the colors indicate the temperatures of various portions of the scene, and including a GPS which simultaneously produces readings of the latitude and longitude of the area being surveyed.

It is another object of the invention to provide an infrared and color video survey system capable of being mounted in an aircraft in which a GPS and a radio altimeter are connected to superimpose latitude and longitude readings and altitude readings on video recordings of the surveyed territories.

It is still another object of the invention to provide an infrared and color video surveying system for geographical areas in which a split screen display showing both the infrared scene and the adjacent color video scene on a monitor is provided.

It is still another object of the invention to provide an infrared and color video survey system in which points of interest in the areas surveyed can be located by their latitude and longitude, and in which such system may be mounted in an aircraft or on a ground vehicle.

It is still another object of the invention to provide an infrared and color video surveying system for geographical areas in which points of interest in the areas surveyed can be located by their latitude and longitude recorded on each frame by scaling the frames as viewed in the monitor, and which system can be mounted in an aircraft or ground vehicle.

It is a further object of the invention to provide a system for producing hard copy survey information on video tape, which can be retained by a pipeline or powerline owner as proof of survey, and referred to for maintenance or for future reference.

These and other objects and advantages of the invention will become apparent from the following detailed description when read in conjunction with the drawings.

DETAILED DESCRIPTION OF THE PREFERRED EMBODIMENT

The infrared survey system of the invention may be effectively used for a variety of survey types. For the purposes of this disclosure, the preferred embodiment will be described with reference to a gas pipeline leak survey using either aircraft mounted or vehicular mounted equipment. Leaks in a high pressure underground pipeline carrying gas will result in expansion of the escaping gas producing cooling of the surrounding soil. Therefore, a thermograph of the area will show a thermal pattern of lower than average temperatures and the lowest temperature will occur most often at the leak location.

Figure 1:
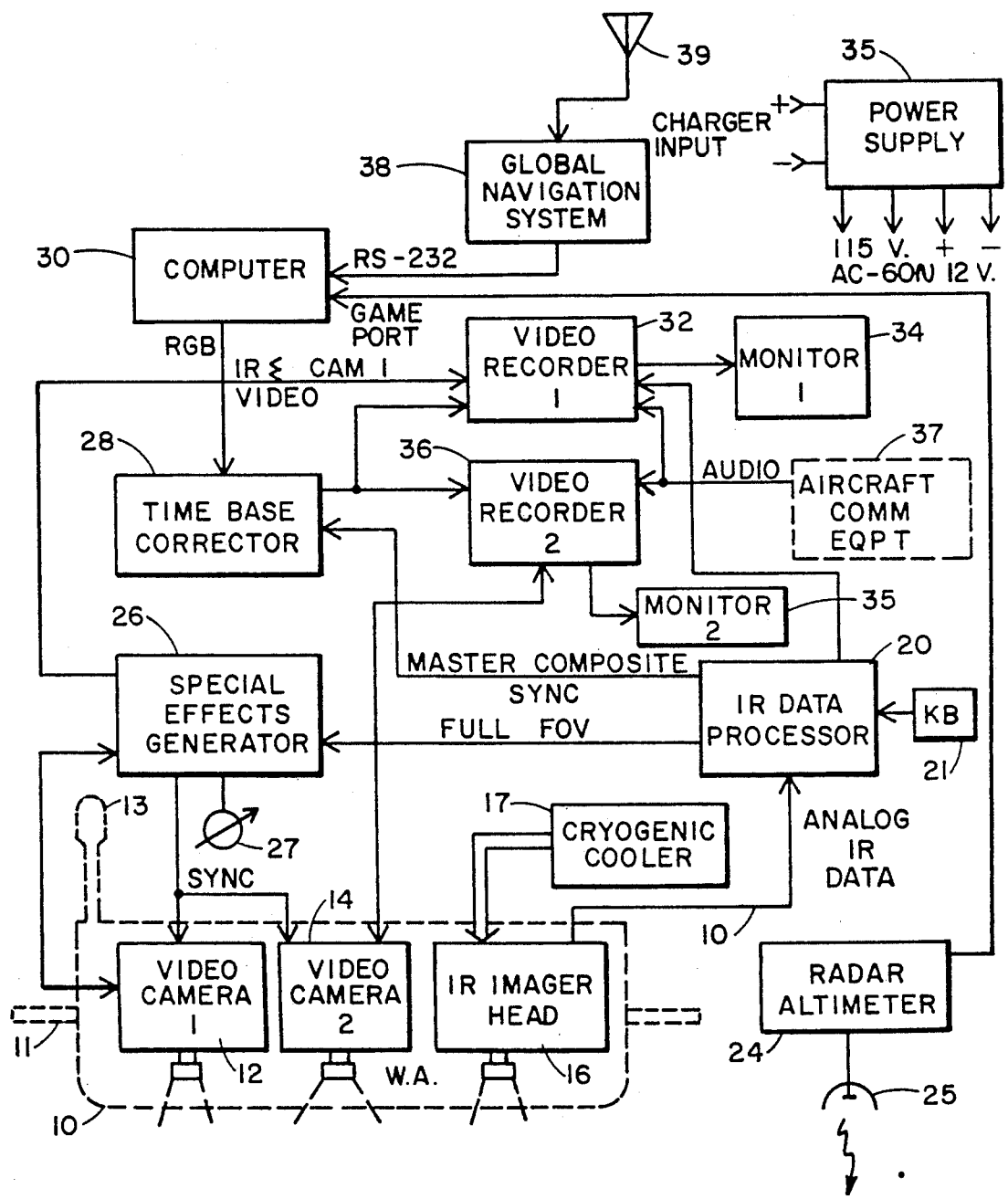
FIG. 1 is a block diagram of a survey system in accordance with the invention adapted for use in an aircraft.

Turning now to FIG. 1, a block diagram of the survey system of the invention for an aircraft mounted system shown. To provide an aerial survey, the equipment may be mounted in a fixed wing aircraft for long distance and cross country surveys. When operating in congested areas or difficult terrain with mountains, the system may be carried in a helicopter. For use in an aircraft, a camera pod 10 is provided which is pivoted along the horizontal axis 11 of the aircraft having a control stick 13 accessible to an operator. Control stick 13 permits the operator to roll the pod if necessary to maintain a target in view. Pod 10 contains a normal field of view video camera 12, referred to herein as camera 1; and a wide angle field of view video camera 14, referred to as camera 2. Cameras 12 and 14 are preferably color cameras and each may be a Javelin Electronics Color Camera Model JE3462HR. Cameras 12 and 14 are oriented vertically such that the ground immediately below the aircraft is centered within the field of views of the cameras 12 and 14 which include genlock capability.

To provide the desired detection of cool areas, indicative of a leak in the pipeline leak detection application, an infrared imager head 16 is mounted with its field of view having the same orientation as cameras 12 and 14. A preferred thermal video system having an infrared imager head is the Hughes Aircraft Company Model 3100 available from Hughes Aircraft Company, Carlsbad, Ca. The hughes imager head has ten active elements and utilizes a collimated beam scanning technique which optomechanically scans a fifteen degree horizontal by a ten degree vertical field of view with 10:1 interlace. A linear array of ten infrared detectors converts the received IR radiation into electrical signals. The spectral range is 2.0 to 5.6 microns. A cryogenic cooler 17 maintains the IR imager head at an operating temperature of 87° K.

The signals from the ten infrared detectors in imager head 16 are connected through appropriate amplifiers to infrared data processor 20. Data processor 20 receives the analog thermographic data transmitted from the IR imager and converts the signals to color thermograms of the area viewed. The color video output is preferably the NTSC standard 525 lines at sixty frames per second. The Model 3100 thermal video system has an observable temperature range of −20° to 950° C. with a sensitivity of 0.5° C. Data processor 30 produces a 200 line display interpolated from 100 IR lines and a display level of sixteen colors. A master composite synchronization signal is generated by data processor 30. Keyboard 21 permits operator control of data processor 30 as discussed hereinafter.

Data processor 20 quantizes the temperature range into sixteen levels, corresponding to the sixteen display colors. The keyboard 21, connected to data processor 20 permits the operator to select a desired range of temperature within the −20° to 950° C. capability of the system. The selected range is provided to first video recorder 32 and is recorded on each video frame as will be discussed hereinbelow. The resolution of each level may be varied from 0.1° C. to 60° C., thus permitting ranges of 1.6° C. to 960° C. to be used, depending upon the resolution desired. The range desired for a survey is selected via keyboard 21. The range may be set at any point within the temperature capability as required by the background temperature and the expected target temperature.

It is desired to combine the video frames from normal field of view camera 12 with the IR frames obtained from IR imager head 16 in one display so taht a pictorial view of the terrain will be presented with the forward portion an infrared thermogram and the following portion a color video frame, the two half-frames matched as will be described in detail hereinbelow.

To produce properly matched frames of video infrared images, pod 10 must have the first video camera 12 and infrared imager head 16 aligned. Each must produce a full field view frame centered on the same point; first camera 12 and imager head 16 are equipped with lenses having the same angle of view. To this end, a special effects generator 26 is utilized which receives the standard full field of view video signal from the first video camera 12, and also supplies a sync signal to that camera. Effects generator 26 also receives the full field of view infrared video signal from data processor 20. Effects generator 26 splits the scanning frame to produce a split screen effect with the IR field of view in the upper or forward half of the screen and the normal color video view in the lower or following half.

A SciTech Special Effects Generator Model 31 is well suited for this function and is available from SciTech of Miami, Fl. The model 31 provides a choice of various types of split screen displays although a horizontally divided screen is preferred for pipeline survey. The combined infrared video from imager head 16 and color video from first video camera 12 is recorded on a first video recorder 32. A second video recorder 36 receives video directly from the second video camera and records the wide angle field of view color image. The video recorders may be Cannon VR-20A models, available from Cannon, U.S.A., Norcross, Ga. 30071.

An important element in the system is the means for determining the ground location of features of interest observed by the system. For example, the location of a pipeline leak indicated by the displays is required to permit ground personnel to find the leak. A global navigation system (GNS) 38 with external antenna 39 is utilized from this purpose. A preferred GNS 38 is the Motorola Global Navigation System which utilizes satellite coordinate information. This system has the capability of locating any point on the earth's surface. GNS 38 transmits the position information produced through an RS-232 connecting cable to computer 30.

An alternative implementation of GNS 38 is a loran-C system, for example, the Apollo 2 Model 612 available from II Morrow, Inc. of Salem, Or. This model has a cross-tracked distance resolution of sixty feet and can track at 650 knots at 20,000 feet. Each reading is accurate within a few feet. Other global navigation systems suitable for use with the invention are Norstar and Omega.

Computer 30 may be any programmable microprocessor computer. For example, a Commodore Amiga 1000 Computer has been used. Computer 30 processes the information received at its RS-232 input from GNS 38 which is transferred through the computer RGB output to time base corrector (TBC) 28 as latitude and longitude information. This information is then transmitted to first and second video recorders 32 and 36 which act as the survey logs for the system. The latitude and longitude information received from GNS 38 is overlaid and recorded on each video frame produced in the survey logs by video recorders 32 and 36. TBC 28 may be a SciTech "Genkey", available from SciTech of Miami, Fl.

The audio inputs of video recorders 32 and 36 are connected to the aircraft communication equipment 37 to record data received from the radios, or from automated pipeline data such as pressure, rate of flow, internal temperature, and the like which are recorded in real time. Also, the crew can enter spoken notes of relevant information. Video monitors 34 and 35, which may be Sony PVM-8221 monitors, are disposed directly in front of the operator of the system and display real time images of data as recorded by first video recorder 32 and second video recorder 36, respectively. This allows the operator to monitor the temperature, range, and resolution of the data from IR data processor 20, the focus of the IR imager head, the display mode of the special effects generator 26, and the data from computer 30. This permits the operator to change, reset, or adjust the system as necessary. Any deviation of the aircraft from its predetermined course can be noted and corrected. The operator may roll the camera mount 10, using control stick 13, as necessary to track the survey route in the event of deviation from course or aircraft roll in the presence of turbulence.

Radar altimeter 24 is provided having a downward looking antenna 25. The signal from altimeter 24 is fed to computer 30 via a game port and is combined with the longitude and latitude information from GBS 38. The altitude is recorded and displayed on each frame of the video recorders 32 and 36. Radar altimeter 24 may be a Terra 3000/TRI 30 model available from Terra Corporation, Albuquerque, New Mexico. The TRA 3000 has an altitude range of 40 to 2500 feet.

Figure 2:
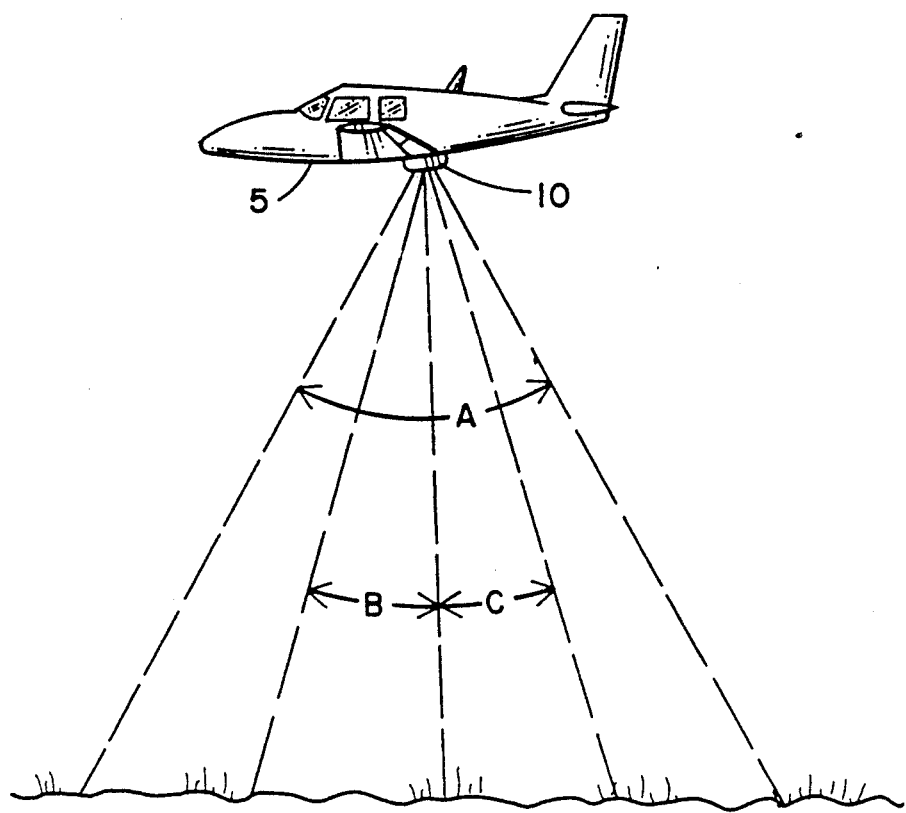
FIG. 2 is a diagram showing the field of view coverages of the two video cameras and the IR imager head of FIG. 1.

Referring now to FIG. 2, an aircraft 5 with the system of FIG. 1 installed therein is shown with a typical longitudinal field of view indicated for each of the three cameras. Field of view B represents the portion of the coverage of the IR imager head 16 which is displayed, providing a thermographic view of the terrain within that field of view. Field of view C indicates the portion of the video color display produced by first video camera 12 of the terrain adjacent to and following the field of view B. Field of view A is the wide angle view of second video camera 14 which provides a color video view of the terrain including the portions of field of views B and C and extending a distance around such fields. For pipeline leak detection, this may assist in locating landmarks and the like. When the system is used for population surveys, the wide field of view is advantageous.

Figure 3:
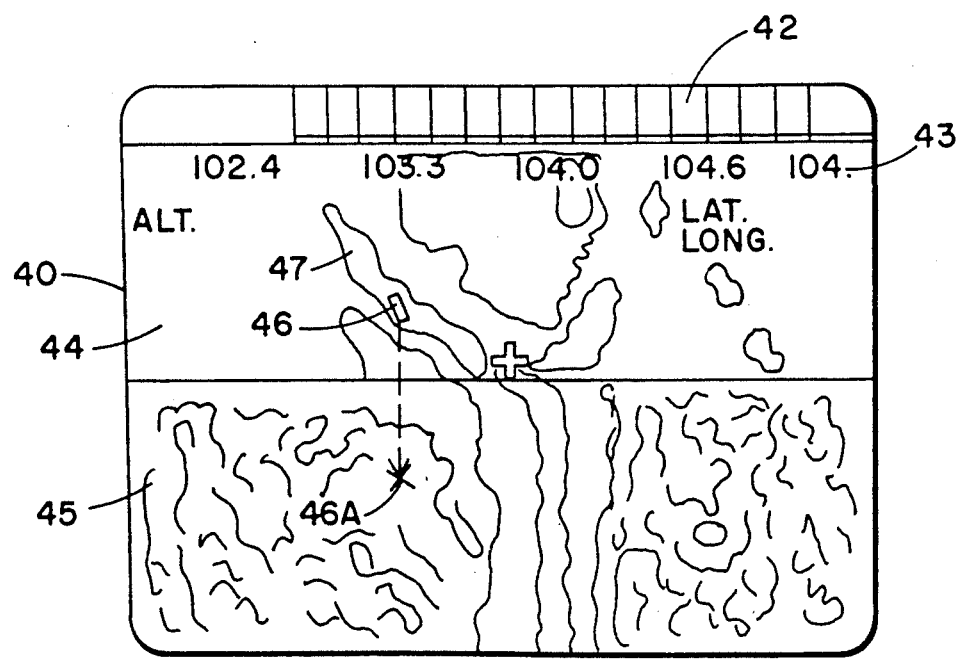
FIG. 3 is a typical split screen image as displayed on the monitor of FIG. 1 and recorded by a video recorder.

A typical split screen image as produced by first video camera 12 and IR imager head 16 is shown in FIG. 3. Frame 40 has been split such that the forward infrared image half-frame 44 appears in the top half of the screen and the following color video image 45 appears in the lower half of the screen in accordance with the fields of view shown in FIG. 2. The Hughes Thermo Image System also produces a set of sixteen color samples 42 ranging from a violet on the left through the spectrum to a white on the right to show the temperature from cooler to warmer. The calibration and range are indicated by number displays 43; in this example, the resolution is 0.6° C. The pattern shown in the infrared display 44 has a region 47 which appears as a dark blue with spots 46 which are violet. The background is a light blue. As will be understood, this indicates that 47 is a cool region with 46 being the coldest portion thereof and would most likely indicate a leak in a gas pipeline. The lower half-frame 45 provides a pictorial view of the area behind and contiguous with the area of the infrared half-frame 44. Half-frame 45 shows heavy foliage with a clearing for the pipeline right-of-way through the center. As will be understood, as aircraft 5 proceeds, the area shown in upper half-frame 44 will be shown pictorially as the color video image of lower half-frame 44.

During playback on the ground, the video recording may be operated in slow motion. In the frames following frame 40 of FIG. 3, point 46 will appear to move downward into the video portion of the frame and point 46 will appear at 46A, shown by the "X" in FIG. 3 and the frame is then stopped. The video representation may be examined to identify the point 46, and the exact location can be scaled from any prominent landmark, such as a fence, ditch, roadway, or the like. Portable tape playback equipment may be carried by ground crews to assist in locating points of interest.

The system advantageously utilizes readily available and proven equipment in a novel combination to provide a flexible, universal system for infrared surveys. A number of the units basically are used which are designed for 115 volt AC 60 Hz power, while others are made for vehicular or aircraft use and operate from 12 V DC. FIG. 1 illustrates a power supply 35 which may contain a high efficiency twelve volt gel cell to provide power to the DC operated equipment. The battery may operate an inverter to produce the 115 V AC 60 Hz cycle required by the other equipment. A charger input is provided to power supply 35 such that, during operation in an aircraft or vehicle, the normal vehicle charging system may be used to maintain the battery voltage.

In the example used to describe the invention, it is, of course, necessary to be able to locate the points of interest found on the ground, for example, a gas leak from a pipeline. In such instance, a vehicle need only be equipped with a GNS receiver to be able to locate an exact latitude and longitude indicated from review of the recorded video and infrared images. Similarly, where surveying is to be done on the ground, a rugged terrain vehicle may have the complete system mounted on the vehicle. The altimeter would not be needed. The camera pod and cameras may be shock mounted on the roof of the vehicle with suitable means for aiming the cameras.

In operation of the system, the operator adjusts temperature range of data processor 20 in accordance with the mission. For example, in pipeline gas leak detection, the average low temperature expected or observed is input by keyboard 21 as the low temperature. The width of the temperature window is controlled by the temperature resolution between color levels as input by the operator. The high temperature measured on the thermogram will be the selected low temperature input plus sixteen times the selected resolution. The operator should adjust low temperature ranes and resolution to conform with average temperatures as observed. This range may vary and need to be reset due to changing terrain, amount of reflected solar radiation, or amounts of moisture in the soil. A gas pipeline leak may cause a colder area to be recorded showing a pattern of progressively colder isotherms with the center of the pipeline leak generally at the coldest point.

For search and rescue over water, the flight survey is preferably made at night to avoid emissivity error. The water temperature plus 1° F. may be input as the low temperature. Resolution is set to a minimum, for example, 0.2° F. producing a temperature envelope of only 3.2° F. Special effects generator 26 is configured to record and show on the monitor a full screen infrared image. The screen will be blank until the survey track passes over a person in the water. Since the person's temperature will be greater than 4.2° above water temperature, the infrared sensor will produce a bright blip on an otherwise blank screen. With latitude and longitude recorded, a record of position is established and can be communicated to the Coast Guard or other rescue forces.

As will now be understood, a survey system particularly well suited for aerial surveying has been disclosed using infrared sensing to identify desired ground features, and which is assembled from readily available equipment. The system may locate points of interest by latitude and longitude coordinates and direct scale measurements within a few feet, thus permitting such surveys to be performed at very low cost and in a minimum of time. Although various specific elements of the invention have been identified by model and manufacture, functional equivalents of such units are available from other sources, and the invention is not to be limited to the specified units. In addition, various modifications may be made in the procedures hereinabove as well as the interconnection of equipment, without departing from the spirit and scope of the invention.

What is claimed is:

1. An infrared earth surface survey system for mounting in a survey vehicle comprising:
   a video camera having a first field of view, said camera producing a sequence of television frames;
   an infrared imager head having a field of view coincident with said video camera field of view;
   an infrared data processor connected to said imager head for receiving analog infrared data therefrom, said processor processing said infrared data to produce a sequence of infrared television frames compatible with said sequence of video television frames, said processor producing a plurality of colors in said frames, each of said colors indicative of a temperature range of a portion of an earth surface within said image head field of view;
   a split-screen generator connected to said infrared data processor and said video camera for combining said sequence of said video television frames to produce a sequence of composite television frames, each of such frames having a first part of one of said infrared television frames and a second part of a corresponding one of said video television frames;
   video recorder means connected to said split-screen generator for recording said sequence of composite television frames;
   a global navigation system for determining coordinates of said survey vehicle;
   a computer for receiving said coordinates from said global navigation system and programmed to produce alphanumeric representations thereof; and
   means connected to said computer and said video recorder means for overlaying respective determined coordinates on each of said composite television frames.

2. The survey system of claim 1 which further comprises:
   radar altimeter means for measuring the height of said vehicle above said portion of earth surface; and
   said computer programmed to produce alphanumeric representations of said measured heights for overlaying on each of said composite television frames.

3. The survey system of claim 1 which further comprises a second video camera having a second field of view wider than said first field of view and including said first field of view, said second video camera producing a second sequence of television frames.

4. The survey system of claim 3 which further comprises second video recorder means connected to said second video camera for recording said second sequence of television frames.

5. The survey system of claim 1 in which said split-screen generator produces said sequence of composite television frames in which said first and second parts of each of said video television frames represents a forward half-frame infrared image and a following half-frame video image wherein said images represent contiguous portions of said earth surface.

6. The survey system of claim 1 in which said video camera produces a sequence of color television frames.

7. The survey system of claim 1 which further comprises a television monitor connected to said video recording means for displaying said sequence of television frames including said overlaid coordinates.

8. The survey system of claim 1 in which said video camera and said infrared imager head are mounted in a pod, said pod manually movable during operation of said survey system.

9. The survey system of claim 1 in which said data processor includes manual adjustment means for selecting said temperature range of said colors, temperature resolution of said range, and a low temperature limit.

10. The survey system of claim 1 in which said infrared imager head is cryogenically cooled.

11. The survey system of claim 1 in which said video recorder includes a sound channel for recording voice and data contemporaneously with said video recording.

12. The survey system of claim 9 in which said data processor produces a set of temperature calibration indices in each of said infrared television frames in accordance with said selected temperature range and temperature resolution.

13. An aerial infrared earth surface survey system for mounting in an aircraft comprising:
  a first video camera having a narrow angle field of view for producing a first sequence of television frames;
  a second video camera having a wide angle field of view, including images within said narrow angle field of view, for producing a second sequence of television frames;
  an infrared imager head having a narrow angle field of view coincidental with said first video camera field of view, said imager head producing analog data representative of temperatures of infrared sources in said imager head field of view;
  an infrared data processor connected to receive said infrared analog data for processing said data to produce a third sequence of television frames compatible with said first sequence of colors therein, each of said colors indicative of a temperature range of said infrared sources;
  a special effects generator connected to receive said third sequence of television frames and said first sequence of television frames to produce therefrom a sequence of split-screen television frames, a first part-screen frame from said third sequence and a second part-screen frame from a corresponding first sequence;
  first video recorder connected to receive and record said sequence of split-screen television frames;
  second video recorder connected to receive and record said second sequence of television frames;
  a global navigation system for determining the latitude and longitude of said aircraft;
  a radar altimeter for determining the height of said aircraft above an earth surface;
  a computer for receiving latitude and longitude data from said global navigation system, and aircraft height data from said radar altimeter, said computer programmed to produce alphanumeric representations of said received latitude and longitude data, and said height data; and
  a time base corrector connected to receive a synchronization signal from said data processor and to receive said alphanumeric representations for overlaying respective latitude, longitude, and height alphanumeric representations on each of said split-screen frames for recording by said first and second video recorders.

14. The survey system of claim 13 in which said infrared imager head is cryogenically cooled.

15. The survey system of claim 13 in which said first and second video cameras each produce color video images.

16. The survey system of claim 13 in which said first and second video recorders include an audio channel for recording an operator voice message and communication data.

17. The survey system of claim 13 which further comprises:
  a pod for mounting said first and second video cameras, and said infrared imager head;
  said pod is mounted in said aircraft and pivoted along a longitudinal axis of said aircraft; and
  said pod includes a control stick for permitting an operator to roll said pod for tracking of earth surface features.

18. The survey system of claim 13 which further comprises:
  a first monitor connected to said first video recorder for monitoring said sequence of split-screen television frames being recorded; and
  a second monitor connected to said second video recorder for monitoring said second sequence of television frames being recorded.

19. A method of locating points of interest on the earth's surface by temperature discrimination comprising the steps of:
  producing a sequence of infrared images of a part of the earth's surface and simultaneously generating a preselected sequence of video television images in geographic and time sequence relationship with the sequence of infrared images; and
  determining the coordinates of each image of the sequence.

20. The method as set forth in claim 19 further comprising the further additional step of recording the sequences and the coordinates.

21. A method of locating points of interest of selected portions of the earth's surface by temperature discrimination comprising the steps of:
  producing a sequence of split-scene television frames in which an upper portion of each frame is an infrared image of a first portion of the earth's surface and a lower portion of each frame is a pictorial video image of a second portion of the earth's surface adjacent to and contiguous with the first portion;
  determining the coordinates of a point in each frame; and recording the sequence of the split-scene television frames and overlaying the coordinates on each recorded frame.

22. A method for locating points of interest on the earth's surface by temperature discrimination comprising the steps of:

moving a video camera and an infrared imager head, the camera and imager head having coincident fields of view, along and over selected areas of the earth's surface for scanning such areas;

producing a sequence of video television frames from the video camera representative of the areas scanned;

producing a sequence of infrared television frames from the infrared imager head having images representative of temperatures of the areas scanned;

determining coordinates of centers of the selected areas in each of the television frames;

producing and recording a sequence of split-screen television frames in which a top portion of each frame is a top portion of an infrared image frame, and the bottom portion of each frame is a bottom portion of the corresponding video frame;

overlaying the determined coordinates of each frame on its respective recording thereof;

playing back the recording to locate a thermal point of interest in the infrared portion of a frame;

advancing the sequence of recorded frames to a frame in which the thermal point of interest appears in the bottom video frame;

visually identifying the location of the thermal point of interest; and determining the location of the thermal point by reference to the overlaid coordinates of a frame containing the thermal point of interest.

23. The method as set forth in claim 22 in which the step of playing back is playing back in slow motion.

24. The method as set forth in claim 22 wherein the determining step includes scaling distances from known distances in the video frame.

25. An earth surface surveying system for association with a survey vehicle comprising:

means for producing a sequence of infrared images of a part of the earth surface;

means for generating a preselected sequence of video television images in geographic and time sequence relationship with the sequence of infrared images of said producing means; and means for determining the coordinates of each image of the sequence.

26. An aerial earth surface survey system for mounting in an aircraft comprising:

a first video camera having a narrow angle field of view for producing a first sequence of television frames;

a second video camera having a wide angle field of view, including images within said narrow angle field of view, for producing a second sequence of television frames;

a special effects generator connected to receive said first and second sequences of television frames and for producing therefrom a sequence of split-screen television frames, a first part-screen frame from said first sequence and a second part-screen frame from a corresponding second sequence;

a first video recorder connected to receive and record said sequence of split-screen television frames;

a global navigation system for determining the latitude and longitude of said aircraft;

an altimeter for determining the height of said aircraft above an earth surface;

a computer for receiving latitude and longitude data from said global navigation system and aircraft height data from said altimeter, said computer being programmed to produce alphanumeric representations of said received latitude and longitude data and said height data; and a time base corrector connected to receive a synchronization signal from said computer and to receive said alphanumeric representations for overlaying respective latitude, longitude, and height alphanumeric representations on each of said split screen frames for recording by said first video recorder.

* * * * *

UNITED STATES PATENT AND TRADEMARK OFFICE
CERTIFICATE OF CORRECTION

PATENT NO. : 5,045,937

DATED     : Sep. 3, 1991

INVENTOR(S) : E.L. Myrick

It is certified that error appears in the above-identified patent and that said Letters Patent is hereby corrected as shown below:

Column 4, line 64:   change "taht" to --that--.

Column 7, line 49:   change "ranes" to --ranges--.

Signed and Sealed this

Second Day of February, 1993

Attest:

STEPHEN G. KUNIN

*Attesting Officer*    Acting Commissioner of Patents and Trademarks